United States Patent
Koyama

(10) Patent No.: US 10,905,156 B2
(45) Date of Patent: Feb. 2, 2021

(54) SEAMLESS CAPSULE, FILTER AND SMOKING EQUIPMENT CONTAINING SAME

(71) Applicant: Sunsho Pharmaceutical Co., Ltd., Fuji (JP)

(72) Inventor: Kenichi Koyama, Fujinomiya (JP)

(73) Assignee: Sunsho Pharmaceutical Co., Ltd.

( * ) Notice: Subject to any disclaimer, the term of this patent is extended or adjusted under 35 U.S.C. 154(b) by 0 days.

(21) Appl. No.: 16/613,336

(22) PCT Filed: Apr. 18, 2019

(86) PCT No.: PCT/JP2019/016612
§ 371 (c)(1),
(2) Date: Nov. 13, 2019

(87) PCT Pub. No.: WO2020/148924
PCT Pub. Date: Jul. 23, 2020

(65) Prior Publication Data
US 2020/0397038 A1    Dec. 24, 2020

(30) Foreign Application Priority Data
Jan. 18, 2019    (JP) .................. 2019-006785

(51) Int. Cl.
*A24D 3/06*    (2006.01)
*A24D 1/00*    (2020.01)

(52) U.S. Cl.
CPC .................... *A24D 3/061* (2013.01)

(58) Field of Classification Search
None
See application file for complete search history.

(56) References Cited

U.S. PATENT DOCUMENTS

| 5,650,232 A * | 7/1997 | Glenn ........................ B01J 2/04 428/402.2 |
| 8,820,331 B2 * | 9/2014 | Hartmann ............... A24D 3/048 131/337 |
| 2016/0021927 A1 * | 1/2016 | Kondo ................... A24D 3/061 131/337 |

FOREIGN PATENT DOCUMENTS

| JP | H10-506841 | 7/1998 |
| JP | 2011-188804 | 9/2011 |

(Continued)

OTHER PUBLICATIONS

JP Office Action in Japanese Appln. No. 2019-006785, dated May 7, 2019, 3 pages (English translation).

(Continued)

*Primary Examiner* — Dennis R Cordray
(74) *Attorney, Agent, or Firm* — Fish & Richardson P.C.

(57) ABSTRACT

The present invention provides a capsule that is capable of suppressing volatilization of a highly volatile capsule content through the capsule shell and that is breakable.
A breakable seamless capsule for a smoking equipment, comprising a content containing an oily ingredient and a capsule shell for encapsulating said content, wherein:
  the capsule shell contains a polysaccharide;
  the thickness of the capsule shell is 60 μm or more;
  the volatilization content (VC) of the content after leaving the content to stand under an environment at a temperature of 25° C. and a relative humidity of 40% for 4 hours is 3.0 wt % or more with respect to the total weight of the encapsulated content; and
  the crush strength per diameter of the capsule is 3-8 N/mm.

12 Claims, 1 Drawing Sheet

(56) References Cited

FOREIGN PATENT DOCUMENTS

| | | |
|---|---|---|
| JP | 5047285 | 10/2012 |
| JP | 5581446 | 8/2014 |
| JP | 2015-037425 | 2/2015 |
| JP | 2018-530310 | 10/2018 |
| WO | WO 2014/170947 | 10/2014 |

OTHER PUBLICATIONS

JP Office Action in Japanese Appln. No. 2019-006785, dated Aug. 6, 2019, 2 pages (English translation).
JP Office Action in Japanese Appln. No. 2019-006785, dated Jun. 18, 2019, 3 pages (English translation).
JP Office Action in Japanese Appln. No. 2019-006785, "Decision to Grant a Patent", dated Aug. 13, 2019, 3 pages (English translation).
PCT International Search Report and Written Opinion in International Appln. No. PCT/JP2019/016612, dated May 21, 2019, 3 pages (English Translation).

* cited by examiner

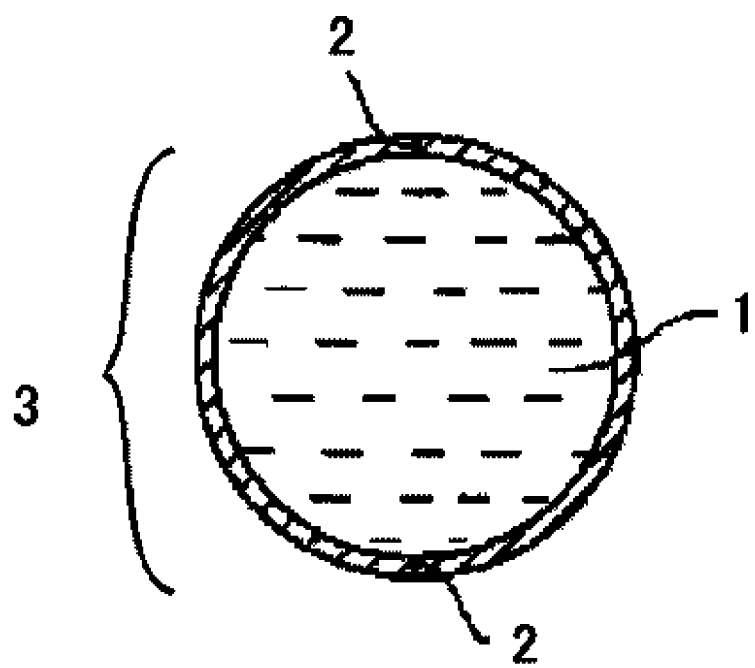

SEAMLESS CAPSULE, FILTER AND SMOKING EQUIPMENT CONTAINING SAME

CROSS-REFERENCE TO RELATED APPLICATIONS

This application is the United States national phase of International Application No. PCT/JP2019/16612 filed Apr. 18, 2019, and claims priority to Japanese Patent Application No. 2019-006785, filed Jan. 18, 2019, the disclosures of which are hereby incorporated in their entirety by reference.

TECHNICAL FIELD

The present invention relates to a breakable seamless capsule, and a filter and a smoking equipment containing the same.

BACKGROUND ART

Conventionally, capsules are widely used in the fields of pharmaceuticals, cosmetics, health supplements and the like. As their uses are broadening recently, not only a conventional technique for enhancing the strength of the capsule shell to make it hard to break but, on the other hand, a technique to cause it to be easily crushed is also required. For example, there is an increasing demand for a capsule encapsulating a flavoring agent or the like which can be embedded in a filter for a cigarette so that the capsule can be crushed upon smoking or else to enjoy the flavor of the capsule content and the popping sound and touch of the crushing of the capsule, and thus a capsule that can easily be broken under pressure applied with fingers of the smoker upon smoking or else has been required. For example, Patent document 1 discloses a breakable capsule which contains hydrophilic colloid in a shell. This capsule is said to be capable of maintaining its breakability even when it is exposed to moisture caused in the smoking equipment by the smoker.

PRIOR ART DOCUMENTS

Patent Document

Patent document 1: Japanese Unexamined Patent Application Publication No. 2015-37425

SUMMARY OF INVENTION

Due to recent demands for capsules with strong flavor and pungency, enhancement of the flavor upon breakage of the capsule has been required. The strength of the flavor caused upon breakage of the capsule correlates to the amount of the content such as a flavoring agent that is released upon breakage. Accordingly, the present inventor tried to increase the proportion of an oily ingredient such as a flavoring agent in the capsule content so as to enhance the flavor upon breakage of the capsule. Oily ingredients such as a flavoring agent, however, are highly volatile. Thus, there was a problem of difficultly in ensuring storage stability of the capsule content because when the capsule contains a high content of an oily ingredient, the capsule content including the oily ingredient is volatilized through the capsule shell with time. For example, since the amount of the flavoring agent volatilized during storage of the capsule increases as the content of the flavoring agent in the content is increased in the shell formulation described in Patent document 1, it is difficult to retain the flavor ingredient in the capsule at a high concentration. Moreover, if the capsule shell is thickened to reduce the amount of the volatilization of the capsule content, the crush strength of the capsule becomes high, which has a problem of difficultly in breaking the capsule by applying pressure with fingers or a problem of deforming, instead of crushing, the capsule. In particular, with a generally used capsule that employs a mixture of gelatin and glycerine as described in Patent document 1, the crush strength of the capsule becomes too high such that it has a problem of difficultly in releasing the content by breaking the capsule.

Moreover, the content of the gelling ingredient contained in the capsule shell may be increased to thicken the shell while suppressing the increase in the crush strength. In this case, however, the viscosity of the shell ingredient becomes high, rendering capsule production difficult.

A capsule that is capable of suppressing volatilization of a highly volatile capsule content through the capsule shell and that is breakable has been desired.

Through trial and error, the present inventor found that the above-described problems can be solved by adjusting the formulation and thickness of the capsule shell, thereby accomplishing the present invention.

The present invention comprises the following embodiments.

[1] A breakable seamless capsule for a smoking equipment, comprising a content containing an oily ingredient and a capsule shell for encapsulating said content, wherein:
    the capsule shell contains a polysaccharide;
    the thickness of the capsule shell is 60 μm or more;
    the volatilization content (VC) of the content after leaving the content to stand under an environment at a temperature of 25° C. and a relative humidity of 40% for 4 hours is 3.0 wt % or more with respect to the total weight of the encapsulated content; and
    the crush strength per diameter of the capsule is 3-8 N/mm.

[2] The capsule according to [1], wherein the polysaccharide comprises a polysaccharide having gelling capacity.

[3] The capsule according to either one of [1] and [2], wherein the capsule shell comprises the followings with respect to the total weight of the capsule shell:
    20-80 wt % of the polysaccharide having gelling capacity;
    4-20 wt % of glycerine; and
    0-40 wt % of at least one selected from starch, dextrins and hydrogenated starch hydrolysates.

[4] The capsule according to any one of [1]-[3], wherein the ratio of the thickness (TH) of the capsule shell to the volatilization content (VC) of the content (TH (μm)/VC (wt %)) is 8 or more.

[5] The capsule according to any one of [1]-[4], wherein the thickness of the capsule shell is 60-110 μm.

[6] The capsule according to any one of [1]-[5], wherein the capsule shell further comprises gelatin.

[7] The capsule according to any one of [1]-[6], wherein the polysaccharide comprises at least one selected from the group consisting of gellan gum, carrageenan, agar, guar gum, guar gum derivatives, enzymatically degraded guar gum, alginic acid or salts thereof, starch and dextrins.

[8] The capsule according to either one of [2] and [3], wherein the polysaccharide having gelling capacity comprises at least one selected from the group consisting of gellan gum, carrageenan and agar.

[9] The capsule according to any one of [1]-[8], wherein the oily ingredient comprises a flavoring agent.

[10] The capsule according to [9], wherein the flavoring agent is at least one selected from the group consisting of spearmint, menthol, peppermint and berries.
[11] The capsule according to any one of [1]4101, wherein the ratio of the shell to the capsule is 9.0-18.0 wt %.
[12] A filter for a smoking equipment comprising the capsule according to any one of [1]-[11].
[13] A smoking equipment comprising the capsule according to any one of [1]-[11] or the filter according to [12].

A capsule that is capable of suppressing volatilization of a highly volatile capsule content through the capsule shell with time and that is breakable is provided.

BRIEF DESCRIPTION OF DRAWINGS

FIG. 1 is a schematic view showing one embodiment of a breakable capsule.

MODES FOR CARRYING OUT INVENTION

Hereinafter, an embodiment of the present invention will be described in detail. The present invention should not be limited to the following embodiments, and may be modified and carried out in any way without departing from the scope of the invention. In the description referring to the drawing, like components are denoted by like reference numerals and repeat descriptions are omitted. The relative ratio of the dimensions in the drawing is exaggerated for the convenience of description and may not be consistent with the actual ratio.

One embodiment of the present invention relates to a breakable seamless capsule for a smoking equipment. This capsule comprises a content containing an oily ingredient and a capsule shell for encapsulating said content, wherein: the capsule shell contains a polysaccharide; the thickness of the capsule shell is 60 µm or more; the volatilization content (VC) of the content after leaving the content to stand under an environment at a temperature of 25° C. and a relative humidity of 40% for 4 hours is 3.0 wt % or more with respect to the total weight of the encapsulated content; and the crush strength per diameter of the capsule is 3-8 N/mm.

<Capsule>

The capsule of the present invention is a breakable seamless capsule.

FIG. 1 is a schematic view showing one embodiment of a breakable capsule. As shown in FIG. 1, a capsule 3 is a seamless capsule having a content 1 and a capsule shell 2. The content 1 is encapsulated in the capsule shell 2. The content 1 of the capsule contains an oily ingredient such as a flavoring agent while the capsule shell 2 contains a polysaccharide.

The capsule 3 is breakable such that the capsule shell 2 can be crushed to release the content 1 from the capsule when pressure is applied thereto with fingers. Specifically, the capsule 3 can be enclosed in a smoking equipment (for example, in a filter inside the smoking equipment) so that pressure can be applied with fingers during use to crush the capsule shell 2. As the capsule shell 2 is crushed, the flavoring agent or the like of the content 1 is released, whereby the flavor can be enjoyed.

Herein, "breakable" means that the capsule shell can be broken under external pressure and release the content, preferably that the capsule shell can be broken under pressure applied with fingers of the smoker and release the content.

According to the present invention, the crush strength per diameter of the capsule is 3-8 N/mm. Crush strength exceeding 8 N/mm is not preferable because crushing the capsule with fingers become difficult. Crush strength less than 3 N/mm renders the capsule to be easily crushed, resulting in poor handling property. In particular, the capsule may be crushed upon enclosing it into a smoking equipment or a filter or during transportation. The crush strength per diameter of the capsule is preferably 3.5-7.5 N/mm, and more preferably 4-7 N/mm. Within such a range, the capsule can be crushed easily with pleasant crushing sensation upon applying force with fingers.

Herein, "crush strength per diameter of the capsule" is calculated by dividing the crush strength (N) of the capsule by the diameter (D) of the capsule (mm). The crush strength (N) is determined by continuously applying load to the capsule particle in the vertical direction until the capsule particle is broken. The maximum load at the moment where the capsule is crushed is the crush strength (N) of the capsule. The crush strength (N) may be measured, for example, with a rheometer (for example, Rheo Meter CR-3000EX from Sun Scientific Co., Ltd.), and analyzed with a Rheodata analyzer (Rheo Data Analyzer for Win, automatic physical property data analysis software from Sun Scientific Co., Ltd.). The diameter of the capsule (mm) is obtained by averaging the long and the short diameter (mm).

The diameter (D) of the capsule (mm) is not particularly limited, and may be determined according to the size of the smoking equipment for which the capsule is used (for example, the diameter of a cigarette). The diameter (D) of the capsule is, for example, 1.5-10.0 mm, preferably 2.0-5 mm and more preferably 2.5-4.5 mm. The average diameter (D) of the capsule preferably lies within the above-mentioned range so as to keep the breakability quality of the capsule uniform. In one embodiment, the diameter (D) of the capsule (mm) is 2.0-3.0 mm (preferably 2.5-3.0 mm). In one embodiment, the diameter (D) of the capsule (mm) is 3.0-5.0 mm (preferably 3.0-4.5 mm).

The diameter and the crush strength of the capsule can be adjusted to stay in the range of the present invention by adjusting the composition and the amount of the capsule shell described later, by adjusting the composition and the amount of the solution of the capsule content, by making adjustments in the capsule production steps (for example, the cooling step, the drying step or the like for the drop-in-liquid technique described later), and/or by coating.

While the shell ratio of the capsule is not particularly limited, it is preferably 7.0-20.0 wt % in terms of excellent heat resistance and humidity resistance, easier crushing upon applying appropriate force with a hand, and good crushing sensation. For example, the shell ratio of the capsule is 10-17.0 wt %, 11.0-19.0 wt %, 11.0-16.0 wt % or 13.0-19.0 wt %. The shell ratio represents the weight percentage of the shell with respect to the whole capsule.

For example, in a case of a capsule with a diameter of about 3.5 mm, the total weight of the capsule is preferably 17-25 mg, more preferably 18-24 mg and still more preferably 19-23 mg.

In a preferable embodiment, the capsule shell is crushed by application of external pressure to the capsule. In a preferable embodiment, the capsule pops and makes popping sound upon crushing.

A "seamless capsule" refers to a capsule having a capsule shell without seams. A seamless capsule makes transmission of the force to its shell easier upon crushing with fingers.

The shape of the capsule is not particularly limited, and it may be, for example, a sphere or a rugby ball shape. It is preferably a sphere and more preferably a perfect sphere. In detail, when it is a perfect sphere, the short diameter/long diameter ratio of the capsule is, but not particularly limited to, preferably 0.90-1.00 and more preferably 0.95-1.00. This ratio results in suitable crush strength, excellent storage stability, easier crushing when external pressure is applied, and excellent enclosure property in a filter for a smoking equipment if the capsule is to be used in a filter for a smoking equipment.

Herein, examples of the "smoking equipment" include a conventional cigarette, a cigar, a pipe and an electronic cigarette.

(Content)

The content contains an oily ingredient. The content preferably contains the oily ingredient as the main ingredient, and may consist only of an oily ingredient. Specifically, the phrase "contains an oily ingredient as the main ingredient" means that the oily ingredient accounts for, for example, 50 wt % or more, preferably 60 wt % or more, more preferably 70 wt % or more and still more preferably 80 wt % or more of the total weight of the content.

Examples of the oily ingredient include, but not particularly limited to, a flavoring agent, a cereal oil, a fruit oil and a lipophilic solvent. The oily ingredient preferably contains a flavoring agent, and more preferably contains a flavoring agent and a lipophilic solvent. This oily ingredient may be prepared as an oil-in-water-in-oil emulsion using known materials. One type of oily ingredient may be used alone or two or more types of them may be used as a mixture.

The flavoring agent is not particularly limited as long as it is an oily ingredient, and either a natural flavoring agent or a synthetic flavoring agent may be used. One type of flavoring agent may be used alone or two or more types of them may be used as a mixture.

Examples of the natural flavoring agent include, but not particularly limited to, oils from orange, neroli, mandarin, petitgrain, bergamot, tangerine, *Citrus unshiu*, cinnamon, *Citrus aurantium*, Hassaku orange, Iyokan, lemon, lime, grapefruit, Yuzu, Sudachi, Kabosu, sweetie, berries such as raspberry, gooseberry, strawberry and cranberry, grape, citronella, elemi, olibanum, marjoram, Angelica root, star anise, basil, hay, calamus, caraway, cardamom, pepper, cascarilla, ginger, sage, clary sage, clove, coriander, eucalyptus, fennel, pimento, juniper, fenugreek, laurel, mace, cedar, Cnidium Rhizome, almond, anise, Artemisia, alfalfa, apricot, ambrette, soft rush, fig, ylang-ylang, wintergreen, Ume plum, elder, *Sophora japonica*, oakmoss, allspice, orris, currant, cassie, chamomile, galangal, Chinese quince, Gambia, guava, camphor tree, gardenia, cubeba, cumin, Cola, Japanese pepper, Sandarac, sandalwood, red sandalwood, shiso, civet, jasmine, ginseng, cinnamonum, starfuit, styrax, spearmint, applemint, peppermint, geranium, thyme, davana, tansy, tangerine, champaca, tuberose, camellia, dittany, tolu balsam, tonka, nut, date, nutmeg, nandina, niaouli, carrot, violet, pineapple, hibiscus, honey, Japanese peppermint, passion fruit, vanilla, rose, coffee, hyssop, Japanese cypress, fusel oil, buchu, pepino, verbena, bois de rose, pawpaw, boldo, boronia, pine, mango, honey wax, mimosa, milfoil, musk, maple, melissa, melon, peach, yara yara, lavender, litsea, linden, rue, wax apple, rosemary, lovage, vanilla, coffee and chocolate.

The synthetic flavoring agent is not particularly limited as long as it is conventionally used for imparting aroma and flavor, where examples thereof include esters, alcohols, aldehydes, ketones, phenols, ethers, lactones, hydrocarbons, nitrogen-containing compounds, sulfur-containing compounds and acids described in "Synthetic Perfumes: Chemistry and Commodity Knowledge" (Motoichi Indo, The Chemical Daily Co., Ltd.) and else.

Examples of esters include, but not particularly limited to, propyl formate, butyl formate, amyl formate, octyl formate, linalyl formate, citronellyl formate, geranyl formate, neryl formate, terpinyl formate, ethyl acetate, isopropyl acetate, isoamyl acetate, hexyl acetate, cis-3-hexenyl acetate, trans-2-hexenyl acetate, octyl acetate, nonyl acetate, decyl acetate, dodecyl acetate, dimethyl undecadienyl acetate, styralyl acetate, ocimenyl acetate, myrcenyl acetate, dihydromyrcenyl acetate, linalyl acetate, citronellyl acetate, geranyl acetate, neryl acetate, tetrahydromugol acetate, lavandulyl acetate, nerolidol acetate, dihydrocuminyl acetate, terpinyl acetate, cityl acetate, nopyl acetate, dihydroterpinyl acetate, 2,4-dimethyl-3-cyclohexenylmethyl acetate, myraldyl acetate, veticol acetate, decenyl propionate, linalyl propionate, geranyl propionate, neryl propionate, terpinyl propionate, tricyclodecenyl propionate, styralyl propionate, anisyl propionate, octyl butyrate, neryl butyrate, cinnamyl butyrate, isopropyl isobutyrate, octyl isobutyrate, linalyl isobutyrate, neryl isobutyrate, linalyl isovalerate, terpinyl isovalerate, phenylethyl isovalerate, 2-methyl pentyl 2-methylvalerate, methyl 3-hydroxyhexanoate, ethyl 3-hydroxyhexanoate, methyl octanoate, octyl octanoate, linalyl octanoate, methyl nonanoate, methyl undecylenate, linalyl benzoate, methyl cinnamate, isoprenyl angelate, methyl geranate, triethyl citrate, ethyl acetoacetate, ethyl 2-hexyl acetoacetate, ethyl benzyl acetoacetate, allyl 2-ethylbutyrate, ethyl 3-hydroxybutyrate, ethyl nonanoate, ethyl decanoate, ethyl 2,4-decadienoate, propyl 2,4-decadienoate, methyl and linalyl anthranilate and ethyl N-methyl anthranilate.

Examples of alcohols include, but not particularly limited to, 3-heptanol, 1-nonanol, 1-undecanol, 2-undecanol, 1-dodecanol, prenol, 10-undecene-1-ol, dihydrolinalool, tetrahydromugol, myrcenol, dihydromyrcenol, tetrahydromyrcenol, ocimenol, terpineol, hotrienol, 3-thujanol, benzyl alcohol, β-phenylethyl alcohol, α-phenylethyl alcohol, 3-methyl-1-pentanol, 1-heptanol, 2-heptanol, 3-octanol, 1-nonanol, 2-nonanol, 2,6-dimethylheptanol, 1-decanol, trans-2-hexenol, cis-4-hexenol, methyl trimethyl cyclopentenyl butenol, citronellol, dihydromyrcenol, rhodinol, geraniol, nerol, linalool, tetrahydrolinalool, dimethyloctanol, hydroxy citronellol, isopulegol, menthol (for example, L-menthol), terpineol, dihydroterpineol, carveol, dihydrocarveol, perilla alcohol, 4-thujanol, myrtenol, α-fenchyl alcohol, farnesol, nerolidol, cedrenol, anise alcohol, hydrotropic alcohol, 3-phenylpropyl alcohol, cinnamic alcohol and amylcinnamic alcohol.

Examples of aldehydes include, but not particularly limited to, acetaldehyde, n-hexanal, n-heptanal, n-octanal, n-nonanal, 2-methyloctanal, 3,5,5-trimethylhexanal, decanal, undecanal, 2-methyldecanal, dodecanal, tridecanal, tetradecanal, trans-2-hexenal, trans-4-decenal, cis-4-decenal, trans-2-decenal, 10-undecenal, trans-2-undecenal, trans-2-dodecenal, 3-dodecenal, trans-2-tridecenal, 2,4-hexadienal, 2,4-decadienal, 2,4-dodecadienal, 5,9-dimethyl-4,8-decadienal, citral, dimethyloctanal, α-methylene citronellal, citronellyl oxy acetaldehyde, myrtenal, neral, α- or β-sinensal, myrac aldehyde, phenyl acetaldehyde, octanal dimethyl acetal, nonanal dimethyl acetal, decanal dimethyl acetal, decanal diethyl acetal, 2-methyl undecanal dimethyl acetal, citral dimethyl acetal, citral diethyl acetal, citral propylene glycol acetal, n-valeraldehyde, isovaleraldehyde, 2-methylbutanal, 2-pentenal, trans-2-heptenal, trans-2-nonenal, 2,6-dimethyl-5-peptenal, 2,4-undecadienal, trimethyl decadienal, citronellal, hydroxy citronellal, safranal, vernaldehyde, benzaldehyde, p-isopropylphenyl acetaldehyde, p-methyl hydrotropic aldehyde, phenyl propionaldehyde, 2-methyl-3-(4-methylphenyl)propanal, cyclamen aldehyde, cinnamic aldehyde, salicyl aldehyde, anise aldehyde, p-methyl phenoxy acetaldehyde, acetaldehydediethyl acetal, citronellyl methyl acetal, acetaldehyde 2-phenyl-2,4-pentanediol acetal, 2-hexenal diethyl acetal, cis-3-hexenal diethyl acetal, heptanal diethyl acetal, 2-hexyl-5-methyl-1,3-dioxolane, citronellal cyclomonoglycol acetal, hydroxy citronellal dimethyl acetal and phenyl acetaldehyde dimethyl acetal.

Examples of ketones include, but not particularly limited to, 2-pentanone, 3-hexanone, 2-heptanone, 3-heptanone, 4-heptanone, 2-octanone, 3-octanone, 2-nonanone, 2-undecanone, methyl heptenone, dimethyl octenone, geranyl acetone, farnesyl acetone, 2,3,5-trimethyl-4-cyclohexenyl-1-methyl ketone, nerone, nootkatone, dihydronootkatone, acetophenone, 4,7-dihydro-2-isopentyl-2-methyl-1,3-dioxepin, 2-pentanone, 3-hexanone, 2-heptanone, 2,3-hexadione, 3-nonanone, ethylisoamyl ketone, diacetyl, amyl cyclopentenone, 2-cyclopentyl cyclopentanone, hexyl cyclopentanone, heptyl cyclopentanone, cis-jasmone, dihydrojasmone, trimethyl pentyl cyclopentanone, 2-(2-(4-methyl)-3-cyclohexene-1-yl)propyl cyclopentanone, damascone, α-dynascone, trimethyl cyclohexenyl butenone, ionone, β-ionone, methylionone, allylionone, plicatone, Cashmeran, 1-carvone, menthone, camphor, p-methyl acetophenone, p-methoxy acetophenone, benzylidene acetone, raspberry ketone, methyl naphthyl ketone, benzophenone, furfural acetone, homofuronol, maltol, ethylmaltol and ethyl acetoacetate ethylene glycol ketal.

Examples of phenols include, but not particularly limited to, thymol, carvacrol, β-naphthol isobutyl ether, anethole, β-naphthol methyl ether, β-naphthol ethyl ether, creosol, veratrole, hydroquinone dimethyl ether, 2,6-dimethoxyphenol, 4-ethylguaiacol, eugenol, isoeugenol, ethyl isoeugenol and tert-butyl hydroquinone dimethyl ether.

Examples of ethers include, but not particularly limited to, decylvinyl ether, α-terpinylmethyl ether, isoproxene, 2,2-dimethyl-5-(1-methyl-1-propenyl)-tetrahydrofuran, rosefuran, 1,4-cineol, nerol oxide, 2,2,6-trimethyl-6-vinyl tetrahydropyran, methylhexyl ether, ocimene epoxide, limonene oxide, rhubofix, caryophyllene oxide, linalool oxide, 5-isopropenyl-2-methyl-2-vinyl tetrahydrofuran, nerol oxide and rose oxide.

Examples of lactones include, but not particularly limited to, γ-undecalactone, dodecalactone, γ-hexalactone, γ-nonalactone, γ-decalactone, γ-dodecalactone, jasmin lactone, methyl γ-decalactone, 7-decenolactone, jasmolactone, propylidenephthalide, hexalactone, δ-2-decenolactone, ε-dodecalactone, dihydrocoumarin and coumarin.

Examples of hydrocarbons include, but not particularly limited to, ocimene, limonene, α-phellandrene, terpinene, 3-carene, bisabolene, valencene, alloocimene, myrcene, farnesene, α-pinene, β-pinene, camphene, terpinolene, p-cymene, cedrene, β-caryophyllene and cadinene.

Examples of nitrogen-containing compounds or sulfur-containing compounds include, but not particularly limited to, methyl anthranilate, ethyl anthranilate, methyl N-methyl anthranilate, methyl N-2'-methyl pentylidene anthranilate, Ligantral, dodecanenitrile, 2-tridecenenitrile, geranylnitrile, citronellylnitrile, 3,7-dimethyl-2,6-nonadienenitrile, indole, 5-methyl-3-heptanone oxime, limonenethiol, 1-P-menthene-8-thiol, butyl anthranilate, cis-3-hexenyl anthranilate, phenylethyl anthranilate, cinnamyl anthranilate, dimethyl sulfide and 8-mercaptomenthone.

Examples of acids include, but not particularly limited to, acetic acid, propionic acid, butyric acid, valeric acid, hexanoic acid, octanoic acid, decanoic acid, dodecanoic acid, 2-decenoic acid, geranic acid, 2-methylbutyric acid, 2-ethylbutyric acid, phenyl acetic acid, cinnamic acid, isobutyric acid, isovaleric acid, 3-methylvaleric acid, 2-hexenoic acid, 2-methyl-2-pentenoic acid, 2-methyl heptanoic acid, myristic acid, stearic acid, lactic acid, pyruvic acid and cyclohexanecarboxylic acid.

Lipophilic solvents are not particularly limited, and those that are generally used in the fields of foods, pharmaceuticals or cosmetics may be used. Examples include triglycerides, especially, triglycerides with fatty acids having 5-12 carbon atoms (medium-chain triglyceride; MCT) (for example, triglyceride with caprylic acid and capric acid), vegetable oils (for example, olive oil, sunflower oil, corn oil, peanut oil, grapeseed oil, wheat germ oil, rapeseed oil, jojoba oil, safflower oil), mineral oils, silicone oil or a mixture thereof with a triglyceride, fatty acids (for example, eicosapentaenoic acid (EPA), docosahexaenoic acid (DHA), etc.), fatty acid esters (for example, isopropyl myristate), sucrose fatty acid esters (SAIB), liquid paraffin and squalene. One type of them may be used alone or two or more types of them may be used as a mixture. The content thereof is not particularly limited as long as it does not impair the effect of the present invention. For example, an amount of a lipophilic solvent with respect to the total weight of the content may be 0-95 wt % or 0.01-90 wt %.

In one embodiment, the flavoring agent is at least one selected from the group consisting of spearmint, menthol, peppermint and berries.

Other than the flavoring agent and the lipophilic solvent, the content may also contain a filler, a sweetener, a cooling agent, a warming agent, a pharmacologically active ingredient or a surfactant as long as it does not impair the effect of the present invention.

A filler may be added for the purpose of adjusting the specific gravity of the content. Examples of such a filler include, but not limited to, an ester resin type dammar resin, tree resins, sucrose acetate isobutyrate (SAIB) or brominated vegetable oils. One type of them may be used alone or two or more types of them may be used as a mixture.

A sweetener may be added in a form of an ethanol solution or suspension. Examples of the sweetener include, but not limited to, aspartame, saccharin, NHDC, sucralose, acesulfame and neotame. One type of them may be used alone or two or more types of them may be used as a mixture.

A cooling or warming agent may be added for the purpose of giving cool or warming sensation in the mouth. Examples of the cooling agent include, but not limited to, menthyl succinate and derivatives thereof. An example of the warming agent includes, but not limited to vanillyl ethyl ether. One type of them may be used alone or two or more types of them may be used as a mixture.

Examples of the pharmacologically active ingredient, but not limited to, anti-inflammatory drugs such as glycyrrhizic acid, derivatives thereof and salts thereof (for example, dipotassium glycyrrhizinate, monoammonium glycyrrhizinate, etc.), seaprose, semi-alkaline proteinase, serrapeptase, tranexamic acid, proctase, pronase and bromelain. One type of them may be used alone or two or more types of them may be used as a mixture.

Surfactants are not particularly limited and any known surfactant can be used.

The volatilization content (VC) of the content after leaving the content to stand under an environment at a temperature of 25° C. and a relative humidity of 40% for 4 hours is 3.0 wt % or more with respect to the total weight of the encapsulated content. One of the features of the capsule of the present invention is that it encapsulates such a highly volatile content. Encapsulation of such a content results in stronger flavor and pungency upon releasing the content by breaking the capsule. A capsule of one embodiment of the present invention suppresses volatilization of the content during storage and thus is excellent in storage stability of the capsule content even when it encapsulates such a highly volatile content.

The volatilization content (VC) of the content after 4 hours is preferably, 3.0-25 wt %, more preferably 3.5-20 wt % and still more preferably 3.5-15 wt %.

(Capsule Shell)

The capsule shell contains a polysaccharide, and, if necessary, a hydrophilic colloid such as gelatin, a plasticizer, a colorant, a sweetener and a flavoring agent in addition to the polysaccharide. Since the capsule shell contains a polysaccharide, a capsule that can suppress volatilization of the encapsulated content can be produced.

Examples of the polysaccharide include, but not particularly limited to, seaweed-derived polysaccharides such as carrageenan, agar, alginic acid or salts thereof, furcelleran and curdlan; resin-derived polysaccharides such as ghatti gum and arabic gum; bacterium-derived polysaccharides such as pullulan, welan gum, xanthan gum and gellan gum; plant-derived polysaccharides such as tragacanth gum, pectin, glucomannan, starch and dextrins; seed-derived polysaccharides such as guar gum, guar gum derivatives, enzymatically degraded guar gum, tara gum, tamarind seed gum, locust bean gum, psyllium seed gum and linseed gum; and fermented polysaccharides such as diutan gum. They may be commercially available products. One type of them may be used alone or two or more types of them may be used as a mixture. Among them, gellan gum, carrageenan, agar, guar gum, guar gum derivatives, enzymatically degraded guar gum, alginic acid or salts thereof, starch and dextrins are preferable, and gellan gum, carrageenan, starch and dextrins are more preferable from the perspective of preventing volatilization of the content.

The polysaccharide preferably comprises a polysaccharide having gelling capacity so as to make a capsule having desirable crush strength and shell strength. The phrase "having gelling capacity" means that it has a property of gelling (preferably at 50° C. or lower and more preferably at 40° C. or lower). Examples of a polysaccharide having gelling capacity include at least one selected from the group consisting of gellan gum, carrageenan and agar.

Furthermore, from the perspective of preventing volatilization of the content, the polysaccharide is preferably any of the following.

(i) Gellan gum,
(ii) Combination of gellan gum and carrageenan
(iii) Combination of gellan gum, carrageenan and a dextrin
(iv) Combination of gellan gum, carrageenan and starch
(v) Combination of gellan gum, carrageenan and agar
(vi) Combination of gellan gum, carrageenan, agar and a dextrin
(vii) Combination of gellan gum, carrageenan, agar and starch
(viii) Combination of carrageenan with guar gum, a guar gum derivative and/or degraded guar gum
(ix) Combination of carrageenan, guar gum, a guar gum derivative and/or degraded guar gum and a dextrin
(x) Combination of carrageenan, guar gum, a guar gum derivative and/or degraded guar gum and starch
(xi) Combination of gellan gum, carrageenan, agar, and guar gum, a guar gum derivative and/or degraded guar gum
(xii) Combination of gellan gum, carrageenan, agar, guar gum, a guar gum derivative and/or degraded guar gum and a dextrin
(xiii) Combination of gellan gum, carrageenan, agar, guar gum, a guar gum derivative and/or degraded guar gum and starch In one embodiment, the capsule shell comprises a polysaccharide and gelatin in combination. When agar is contained as a polysaccharide, however, it preferably does not contain gelatin. Examples of a preferable combination include combinations of gelatin and either one of polysaccharide combinations (i)-(xiii) above.

In one embodiment, the capsule shell is gelatin-free.

While the content of the polysaccharide is not particularly limited as long as the effect of the present invention is not impaired, it is preferably 15-96 wt %, more preferably 20-95 wt %, still more preferably 25-90 wt % and particularly preferably 30-90 wt % with respect to the total weight of the capsule shell from the perspective of preventing volatilization of the content and achieving crushing sensation of the capsule.

If gelatin is contained, the total content of the polysaccharide and gelatin is preferably 70-99 wt % and more preferably 80-98 wt % with respect to the total weight of the capsule shell. If gelatin is not contained, the content of the polysaccharide is preferably 70-99 wt % and more preferably 80-95 wt % with respect to the total weight of the capsule shell.

While the content of the polysaccharide having gelling capacity is not particularly limited as long as the effect of the present invention is not impaired, it is preferably 50-95 wt % and more preferably 55-95 wt % with respect to the total weight of the capsule shell from the viewpoints of crush strength and shell strength of the capsule.

Gellan gum can be classified into acylated gellan gum (native gellan gum) and deacylated gellan gum according to the presence of acylation. Acylated gellan gum generally has a property of forming soft and elastic gel. Deacylated gellan gum generally has a property of forming hard and brittle gel. While either of them may be used for the present invention, deacylated gellan gum is preferable since it has lower gelling temperature and is suitable for capsule production.

Examples of commercially available products of acylated gellan gum include Kelcogel HT and Kelcogel LT100 from CP Kelco. Examples of commercially available products of deacylated gellan gum include Kelcogel and Kelcogel F from CP Kelco.

Examples of carrageenan include, but not particularly limited to, κ (kappa) carrageenan, ι (iota) carrageenan, λ (lambda) carrageenan, μ (mu) carrageenan, ν (nu) carrageenan, θ carrageenan, ζ (zeta) carrageenan and π carrageenan. One type of them may be used alone or two or more types of them may be used as a mixture. Among them, κ (kappa) carrageenan and ι (iota) carrageenan are preferable in terms of excellent gelling capacity for production, excellent heat resistance and humidity resistance of the resulting capsule, easy crushing upon application of external pressure and good crushing sensation and feeling.

Carrageenan is produced by extraction from a whole alga of the red algae family Gigartinaceae, Solieriaceae, Hypneaceae or the like, using known means and technique. Carrageenan may be a commercially available product. Examples of a commercially available product include Genuvisco (iota type, Sansho Co., Ltd.), Genugel (kappa type, Sansho Co., Ltd.) and Satiagel ME4SB (SATIAGEL ME4SB, kappa type, Cargill Japan), and a favorable example includes Satiagel ME4 (SATIAGEL ME4, kappa type, Cargill Japan). Moreover, kappa carrageenan is preferably used if the capsule is made transparent or translucent to give color to match the image of the product.

While the viscosity of carrageenan is not particularly limited, it is preferably 5 mPa·s or more in terms of excellent storage stability, breakability and the like of the resulting capsule, easier crushing when suitable force is applied with a hand, good crushing sensation and pleasant feeling. While the upper limit of viscosity is not particularly limited, it is preferably 500 mPa·s or less. Viscosity refers to a value determined according to the method described in Japan's Specifications and Standards for Food Additives (8th ed.), which can be determined, for example, with a B-type viscometer (manufacturer: BROOKFIELD, MODEL: LVDVE115).

While pH of carrageenan is not particularly limited, it is preferably 6.5-13.0 and more preferably pH 7.8-12.0, for example, in a 1% solution at 20° C., in terms of excellent storage stability, breakability and else of the resulting capsule.

While the content of carrageenan is not particularly limited, it is usually 1.0-50.0 wt % and preferably 3.0-45.0 wt % with respect to the total weight of the capsule shell. Viscosity of a capsule shell solution tends to increase with an increase in carrageenan.

Examples of agar include, but not particularly limited to, agar powder, solid agar and agar flake, where agar powder is preferable. Examples of a source of the agar used for the present invention include, but is not particularly limited to, red algae. Examples of red algae include, *Gelidium amansn* and *Gracilaria verrucosa*, where *Gelidium amansii* is preferable. Agar may be a commercially available product.

Among them, agar preferably has high gel strength from the viewpoints of excellent heat resistance and humidity resistance of the resulting capsule, easy crushing upon application of external pressure and good crushing sensation and feeling. Specifically, agar preferably has gel strength of 600 g/cm$^2$ or more, more preferably 650 g/cm$^2$ or more, and still more preferably 700 g/cm$^2$ or more. The gel strength is a value determined by Nikkansui-type method. Specifically, a 1.5% agar solution is prepared and left to gel at 20° C. for 15 hours so as to determine the maximum load (gram) per 1 cm$^2$ of the surface of the gel that withstood for 20 seconds as the gel strength. The gel strength refers to a value at a concentration of 1.5%. One type of them may be used alone or two or more types of them may be used as a mixture.

While the content of agar is not particularly limited, it is usually 1-60 wt % and preferably 20-55 wt % with respect to the total weight of the capsule shell in terms of viscosity.

Guar gum is produced by subjecting bean of guar, which is a legume plant, to pulverization or extraction using known means and method. Alternatively, a guar gum derivative may be used instead of or in addition to guar gum. Examples of a guar gum derivative include, but not particularly limited to, hydroxypropyl guar gum and cationic guar gum.

While the content of guar gum or a guar gum derivative is not particularly limited, it is 1-20 wt % and preferably 1.5-10 wt % with respect to the total weight of the capsule shell in terms of viscosity.

The degraded guar gum is not particularly limited as long as it has the effect of the present invention, where an example includes enzymatically degraded guar gum. One type of them may be used alone or two or more types of them may be used as a mixture.

They may be commercially available products. Examples of commercially available products include Fiberon (Sumitomo Dainippon Pharma Co., Ltd.), Guarfiber (Meiji Food Materia Co., Ltd.), Sunfiber (Taiyo Kagaku Co., Ltd.), DoFiber (Taisho Pharmaceutical Co., Ltd.), Neovisco G (Sansho Co., Ltd.), Meypro HPG series (Sansho Co., Ltd.), Jaguar C series (Sansho Co., Ltd.), Meypro gum (Sansho Co., Ltd.), Cellpearl FG series (Somar Corporation) and RG100 (MRC Polysaccharide Co., Ltd.).

While the content of the degraded guar gum is not particularly limited, it is 1-20 wt % and preferably 1.5-10 wt % with respect to the total weight of the capsule shell from the perspective of viscosity.

The capsule shell may contain alginic acid or a salt thereof from the perspective of storage stability and breakability of the capsule. Preferable examples of the alginic acid salt include, but not particularly limited to, metal alginates. Specific examples include alkali metal salts such as sodium salts and potassium salts, alkaline earth metal salt such as calcium and magnesium salts, metal salts such as iron and tin, where sodium alginate and potassium alginate are particularly preferable and sodium alginate is most preferable. One type of them may be used alone or two or more types of them may be used as a mixture. The metal salt of alginic acid preferably has low viscosity, for example, of preferably 500 mPa·s or lower and more preferably 400 mPa·s or lower. Viscosity refers to a value determined according to the method described in Japan's Specifications and Standards for Food Additives (8th ed.), which can be determined, for example, with a B-type viscometer (manufacturer: BROOKFIELD, MODEL: LVDVE115). Alginic acid or a salt thereof may be used alone or two or more types of them may be used as a mixture.

If the capsule is to be made transparent or translucent, sodium alginate is preferably used as the alginic acid salt so that the capsule can be colored easily. Alginic acid or a salt thereof can be obtained by extracting alginic acid from brown algae using known means and method. They may be commercially available products. An example of such a commercially available product includes Sanalgin (Sansho Co., Ltd.).

While the content of alginic acid or the salt thereof is not particularly limited, it is, for example, 1.0-50.0 wt % and preferably 3.0-45.0 wt % with respect to the total weight of the capsule shell from the perspective of viscosity.

The dextrin preferably has dextrose equivalent (DE) of 20 or less. Dextrose equivalent (DE) is a relative measure representing the degree of hydrolysis, provided that the reducing power of dextrose (glucose) is 100. Dextrose equivalent (DE) closer to 0 represents characteristics closer to starch while dextrose equivalent (DE) closer to 100 represents characteristics closer to glucose that results from hydrolysis of starch. Dextrose equivalent (DE) can be determined by Lane-Eynon method.

Examples of a dextrin include, but not particularly limited to, a dextrin, a maltodextrin, an indigestible dextrin and a cyclodextrin ($\alpha$, $\beta$ or $\gamma$). They may be commercially available products. The content of the dextrin is preferably 1-40 wt % and more preferably 5-30 wt % with respect to the total weight of the capsule shell. For example, a dextrin, a maltodextrin and an indigestible dextrin may be a product from Matsutani Chemical Industry Co., Ltd., or the like.

Starch is not particularly limited and may be a commercially available product. The content of starch is preferably 1-40 wt % and more preferably 5-30 wt % with respect to the total weight of the capsule shell.

Examples of gelatin include, but not particularly limited to, pork gelatin, beef gelatin and fish gelatin. Moreover, gelatin is not particularly limited and gelatin derivatives such as succinylated gelatin, gelatin hydrolysate, hydrolyzed gelatin and crosslinked gelatin may be used. They may be commercially available products. One type of them may be used alone or two or more types of them may be used as a mixture. When mammal-derived ingredients (for example, cow, pig, etc.) are not to be used due to restriction for religious reasons, allergy problems or the like, a non-mammal capsule can be produced without using mammal-derived gelatin.

While gelatin is not particularly limited, it preferably has high strength from the viewpoints of excellent heat resistance and humidity resistance of the resulting capsule, easier crushing upon application of suitable force with a hand, good crushing sensation and pleasant feeling. For example, gelatin preferably has a Bloom strength (Bloom number) of 190 or more, more preferably 220 or more, and still more preferably 250 or more. Bloom strength is defined by the mass required for a cylindrical piston with a diameter of 12.7 mm to depress the gel by 4 mm. They may be commercially available products (for example, Rousselot products).

While the content of gelatin is not particularly limited, it is usually less than 75 wt %, preferably 70 wt % or less, more preferably 60 wt % or less and still more preferably 50 wt % or less with respect to the total weight of the capsule shell. The more the gelatin is contained, the harder the capsule becomes, by which the crush strength is enhanced but crushing becomes difficult.

The capsule shell preferably contains a plasticizer from the perspective of crush strength and impact resistance. Examples of a plasticizer include, but not particularly limited to, polyhydric alcohols such as glycerine, polyethylene glycol, propylene glycol and polypropylene glycol; monosaccharides such as glucose, fructose, glucose and galactose; disaccharides such as sucrose, maltose, trehalose, coupling sugar and oligosaccharides such as maltooligosaccharides; sugar alcohols such as sorbitol, maltitol, lactitol, palatinit, xylitol, mannitol and galactitol; polyvinyl alcohol; triacetin; starch derivatives such as polydextrose and hydrogenated starch hydrolysates; and cellulose derivatives such as hydroxymethyl cellulose (HPMC), hydroxypropyl cellulose (HPC), methyl cellulose (MC) and carboxymethyl cellulose (CMC). One type of them may be used alone or two or more types of them may be used as a mixture. They may be commercially available products. For example, a maltooligosaccharide may be a product from Matsutani Chemical Industry Co., Ltd. or the like. DE (degree of starch hydrolysis) of the starch derivative is preferably around 10-90.

While the content of the plasticizer is not particularly limited, it is preferably less than 15 wt % and more preferably 13 wt % or less except when a single type of shell-forming base material is used alone (when agar, carrageenan or gelatin is used alone), considering that the resulting capsule has excellent heat resistance and humidity resistance, is easily crushed when suitable force is applied with a hand and has pleasant feeling. When a single type of shell-forming base material is used alone (when agar, carrageenan or gelatin is used alone), the content of the plasticizer in the capsule shell is about 35 wt % at maximum and preferably 30 wt % or less.

While the content of the plasticizer is not particularly limited, it is preferably 1 wt %-30 wt % and more preferably 4 wt %-20 wt % with respect to the total weight of the capsule shell from the perspective of impact resistance.

Among them, the plasticizer preferably contains glycerine from the perspective of impact resistance. The content of glycerine is preferably 1 wt %-30 wt % and more preferably 4 wt %-20 wt % with respect to the total weight of the capsule shell.

If the capsule shell contains gelatin, the content of glycerine is preferably 4 wt %-20 wt % with respect to the total weight of the capsule shell from the perspective of impact resistance.

In one embodiment, the plasticizer contains at least one selected from glycerine and/or hydrogenated starch hydrolysate.

In a preferable embodiment, the capsule shell contains 20-80 wt % (preferably 30-75 wt %) of a polysaccharide having gelling capacity, 4-20 wt % (preferably 5-15 wt %) of glycerine, and 0-40 wt % (preferably 5-30 wt %) of at least one selected from starch, a dextrin and a hydrogenated starch hydrolysate.

While the colorant is not particularly limited, it may be, for example, a known colorant, pigment or the like. The content of the colorant is not particularly limited as long as the effect of the present invention is not impaired. They may be commercially available products.

Examples of the sweetener include, but not particularly limited to, sucralose, acesulfame, aspartame, saccharin, trehalose, sorbitol, sucrose and erythritol. One type of them may be used alone or two or more types of them may be used as a mixture. The content of the sweetener is not particularly limited as long as the effect of the present invention is not impaired. They may be commercially available products.

The thickness (TH) of the capsule shell is 60 μm or more from the perspective of preventing volatilization of the content and achieving crush strength. The thickness (TH) of the capsule shell is preferably 60-110 μm, more preferably 60-100 μm and still more preferably 65-90 μm. The thickness (TH) of the capsule shell can be determined, for example, with a digital microscope (for example, VHX-900 (trade name) from Keyence Corporation, using calibration scale of 10 μm). The average thickness (TH) of the capsule shell preferably lies within the above-mentioned range so as to keep the breakability quality of the capsule uniform.

For prevention of volatilization of the content, the ratio of the thickness (TH) of the capsule shell to the volatilization content (VC) of the content (TH (μm)/VC (wt %)) is preferably 8 or more. TH (μm)/VC (wt %) is more preferably 8-50 and still more preferably 10-40.

The water activity of the capsule shell is preferably 0.400-0.650, more preferably 0.410-0.630 and still more preferably 0.420-0.620. While moisture could cause deterioration of the storage stability, the microbes involved in spoilage existing in the capsule can only use the moisture called "free water". Water activity (Aw) refers to the proportion of the free water determined at 22° C. and 60% RH (relative humidity) using a water activity measurement system from Rotronic immediately after the production. Examples of a water activity measurement system from Rotronic include the Aw series (for example, Aw-Lab, Aw-Palm, Aw-Quick, etc.).

While the water content of the capsule shell is not particularly limited, it is preferably 10.0% or more and 19.0% or less, more preferably 11.0% or more and 18.0% or less, and still more preferably 12.0-16.0%. The average water content of the capsule particularly preferably lies within the above-mentioned range so that any capsule can be easily crushed with equal force and the breakability quality can be kept uniform. Herein, the water content is determined according to the method described in the Japanese Pharmacopoeia, specifically, a value calculated by measuring the dry weight at the end of a treatment at 110° C. for 120 minutes following the state at 22° C. and 60% RH.

<Method for Producing Capsule>

The method for producing the capsule is not particularly limited, and a method can appropriately selected from any known production methods. For example, methods described in Japanese Patent Publication No. 5047285, Japanese Unexamined Patent Application Publication (translation of PCT) No. 10-506841, Japanese Patent Publication No. 5581446 or the like can be employed. For example, it may be a drop-in-liquid technique employing a dropping system using a double- or multiple (triple or more)-concentric nozzle (seamless capsule technique). The capsule shell can be filled with a capsule content by this method, and then shaped and dried.

Specifically, a capsule shell solution containing ingredients of a capsule shell, a capsule content, and, if necessary, an intermediate layer material are forced out into carrier liquid using a double- or multiple (triple or more)-concentric nozzle so as to fill the capsule shell with the capsule content. The resultant is then subjected to light irradiation, heating and/or cooling for curing the capsule shell solution to form a capsule, which is then subjected to drying, thereby producing a capsule.

The capsule shell solution can be prepared by dissolving the ingredients of the capsule shell in a solvent. The solvent is not particularly limited as long as it does not impair the effect of the present invention, and examples thereof include water and alcohols such as ethanol, preferably water. It is preferable to perform a heat treatment upon dissolving the shell forming agent in the solvent. While the heating temperature is not particularly limited, it is about 60-100° C. and more preferably about 70-95° C. While the viscosity of the capsule shell solution (mixture solution) at 95° C. is not particularly limited, it is preferably 50-500 mPa·s and more preferably 50-200 mPa·s for attaining effects such as breakability of the capsule (uniform shell). For example, the viscosity can be measured with a B-type viscometer (manufacturer: BROOKFIELD, MODEL: LVDVE115).

The wet capsule shaped by the above-described method is dried to obtain a dry capsule. This drying is generally conducted by using, for example, a "rotary drum dryer" equipped with an air blower. Alternatively, a fluidized bed type dryer may be employed for smaller capsules such as seamless capsules, in which the capsules are blown up to be dried in a fluidized state. While the drying temperature is not particularly limited, it may be about 20-50° C.

<Coating>

In order to keep the humidity of the capsule and crush the capsule easily, the capsule may be coated with a coating agent such as zein to have a coating layer.

Examples of the coating agent include, but not particularly limited to, commonly known coating agents such as hydroxypropyl methyl cellulose, ethyl cellulose, methacrylic acid copolymer, shellac, water-soluble shellac, silicone oil, methyl cellulose, carnauba wax and zein. One type of them may be used alone or, if necessary, two or more types of them may be used in an appropriate combination. Examples of a commercially available product include Opadry and Eudragit. The thickness of the coating layer is not particularly limited as long as the effect of the present invention is not impaired.

Examples of the coating method include, but not limited to, a method in which a coating agent dissolved or dispersed in a volatile solvent or the like is sprayed or applied onto dried capsules and subsequently the volatile solvent is vaporized (glazing method), a method in which dried capsules are immersed in a coating agent dissolved or dispersed in a volatile solvent or the like and subsequently the volatile solvent is vaporized (dipping method), and a method in which a coating agent is diffused or suspended in a capsule shell solution in advance upon preparation of the capsule shell solution (kneading method).

<Use of Capsule>

The breakable capsule of one embodiment of the present invention can be used for a smoking equipment, preferably for a cigarette, a cigar or a pipe.

In one embodiment, the capsule is inserted into a filter.

One embodiment of the present invention provides a filter for a smoking equipment which comprises the capsule of the above-described embodiment. Additionally, one embodiment of the present invention provides a smoking equipment comprising the capsule of the above-described embodiment or a filter comprising said capsule.

The present invention comprises aspects consisting of any combination of the above-described components as long as they have the effect of the present invention within the technical scope of the present invention.

EXAMPLES

Hereinafter, the present invention will be described in detail with reference to the examples, but the technical scope of the present invention should not be limited thereto. Unless otherwise specified, "parts" and "%" in each of the examples are used on weight basis.

Moreover, physical properties were each determined by the following methods.

(Thickness of Capsule Shell)

The capsule was divided into two in the middle to measure the thicknesses at four parts that were almost evenly spaced apart in the up/down and left/right directions and average the resultant to give the thickness of the capsule shell. VHX-900F from Keyence Corporation was used for this measurement.

(Capsule Diameter)

The long and short diameters (mm) of the capsule were measured with a microgauge from Mitutoyo Corporation and averaged to give the capsule diameter. Measurement was conducted for 20 samples to determine their average diameter as the capsule diameter.

(Crush Strength of Capsule)

Rheometer CR-3000EX (from Sun Scientific Co., Ltd.) was used to determine crush strength of 20 capsules and the resultant was averaged to give the crush strength of the capsule.

(Volatilization Content VC)

The capsule content was placed in a 87 mm-diameter glass petri dish (height 19 mm) and left to stand in THN062PC type thermo-humidistat chamber (manufacturer: Advantec Toyo Kaisha, Ltd.) set at a temperature of 25° C. (±2° C.) and a relative humidity of 40% (±5%) for 4 hours. The initial weight (encapsulated weight) of the capsule content (W1) and the weight of the capsule content after 4 hours (W2) were determined. The capsule content used was about 2 g each, and the capsule weight was determined with analytical electronic balances GR-200.

For each capsule content, volatilization content VC was calculated using the following equation.

[Volatilization content $VC$ (wt %)]=$(W1-W2)/W1 \times 100$

<Determination of Volatilization Content of Content Encapsulated in Capsule>

1. Preparation of Capsule Content

The flavoring ingredients and the lipophilic solvents shown in Table 1 were added and mixed to obtain Capsule contents 1-10. Volatilization content VC was calculated for each capsule content. The results are shown in Table 1.

The detail of the flavoring ingredients and the lipophilic solvents used were as follows.

(Flavoring Ingredients)

Flavoring agent 1: L-Menthol (from Takasago International Corporation)

Flavoring agent 2: Grape and berry flavoring agent No. 984 (from Oosaka-Koryo Corporation)

Flavoring agent 3: Spearmint oil (from Nagaoka & Co., Ltd.)

Flavoring agent 4: peppermint oil (from Nagaoka & Co., Ltd.)

(Lipophilic Solvents)

Solvent 1: Coconard ML (C8/C10/C12 fatty acid triglyceride, from Kao Corporation)

Solvent 2: Olive oil (extra virgin olive oil: from Agroalimentaria MUSA S.L)

For capsule production, purified water was added to the shell ingredients above such that the shell viscosity lies in a range of 50-200 mPa·s at 95° C., and the resultant was heated at 95° C. for 2 hours while stirring to prepare a shell solution for use in the capsule production.

The produced capsule was dried under an environment at 25° C. (±5° C.) and a humidity of 40% RH (±20%) using a rotary dryer until the water activity of the capsule became 0.3-0.6.

Two to three types of capsules having different capsule shell thicknesses were produced for each capsule content.

The thickness of the capsule shell and the crush strength of the capsule were determined for the produced capsules. The results are shown in Tables 3-5.

TABLE 1

| Capsule content No. | Content composition ||||| Initial weight (g) | Weight after 4 hours (g) | Volatilization content VC (wt %) |
|---|---|---|---|---|---|---|---|---|
| | Flavoring agent ||| Lipophilic solvent || | | |
| | Type | Content (wt %) | Type | Content (wt %) | Type | Content (wt %) | | | |
| 1 | — | — | — | — | Solvent 1 | 100 | 2.012 | 2.012 | 0 |
| 2 | — | — | — | — | Solvent 2 | 100 | 2.003 | 2.003 | 0 |
| 3 | Flavoring agent 1 | 25 | — | — | Solvent 1 | 75 | 2.012 | 1.954 | 2.9 |
| 4 | Flavoring agent 1 | 35 | — | — | Solvent 1 | 65 | 2.006 | 1.933 | 3.6 |
| 5 | Flavoring agent 1 | 45 | — | — | Solvent 1 | 55 | 2.007 | 1.895 | 5.6 |
| 6 | Flavoring agent 1 | 50 | — | — | Solvent 1 | 50 | 2.002 | 1.875 | 6.3 |
| 7 | Flavoring agent 2 | 30 | — | — | Solvent 1 | 70 | 2.002 | 1.901 | 5.1 |
| 8 | Flavoring agent 3 | 10 | — | — | Solvent 1 | 90 | 2.011 | 1.963 | 2.4 |
| 9 | Flavoring agent 1 | 30 | Flavoring agent 3 | 10 | Solvent 1 | 70 | 2.001 | 1.922 | 4.0 |
| 10 | Flavoring agent 4 | 10 | — | — | Solvent 1 | 90 | 2.012 | 1.977 | 1.7 |

Capsule Production Example 1

<Production of Capsule>

A drop-in-liquid technique, a method for producing a seamless capsule, was employed to produce capsules (perfect spheres) encapsulating liquid of respective capsule contents. The diameter of the capsule was about 3.5 maw) and the weight of the encapsulated capsule content was 19.3 mg.

Formulation of the capsule shell was as follows.

TABLE 2

| Formulation of capsule shell | |
|---|---|
| Ingredient | Weight (%) |
| Gellan gum (Kelcogel; from CP Kelco) | 35 |
| Pork gelatin (BCN250SC; from Nitta Gelatin Inc.) | 55 |
| Hydrogenated starch hydrolysate (PO10; from Toa Kasei Co., Ltd.) | 5 |
| Glycerine (food-additive-grade glycerine; from Sakamoto Yakuhin Kogyo Co., Ltd.) | 4.5 |
| Blue No. 1 (from San-Ei Gen F.F.I., Inc.) | 0.5 |

<Evaluation of Storage Stability (Percentage of Weight Loss after 12 Months)>

30 g of the produced capsule was placed in a standard No. 6 bottle without a stopper and stored under an environment at a temperature of 40° C. and a relative humidity of 75%. Capsule weights after 4, 8, and 12 months were determined. The percentage of weight loss after 12 months (%) was calculated from the difference between the capsule weight after 12 months ($W_{C12}$) and the weight before storing the capsule ($W_{C0}$).

Percentage of capsule loss after 12 months (%) = $(W_{C12} - W_{C0})/W_{C0} \times 100$ For the measurement of the capsule weight, humidity was controlled in a thermo-humidistat chamber at a temperature of 25° C. and a relative humidity of 45% for 24 hours to maintain the water content of the shell constant.

The results are shown in Tables 3-5. The shell ratios of the capsules shown in Tables 3, 4 and 5 were about 7 wt %, about 11 wt % and about 15 wt %, respectively.

TABLE 3

| | | Capsule content | | | Thickness (TH) of capsule shell (μm) | Crush strength (N)/ diameter (mm) | TH (μm)/ VC (%) | Capsule weight | | | | Percentage of weight loss after 12 months (%) | |
|---|---|---|---|---|---|---|---|---|---|---|---|---|---|
| | No. | Volatilization content (VC) (%) | Capsule diameter (mm) | Crush strength (N) | | | | Initial weight (mg) | 4 months later (mg) | 8 months later (mg) | 12 months later (mg) | | |
| A1 | 1 | 0 | 3.35 | 9 | 28 | 2.7 | — | 20.6 | 20.6 | 20.7 | 20.6 | 0 | Comparative example |
| A2 | 2 | 0 | 3.36 | 9 | 32 | 2.7 | — | 20.7 | 20.7 | 20.7 | 20.6 | 0.5 | Comparative example |
| A3 | 3 | 2.9 | 3.35 | 10 | 29 | 3.0 | 10.1 | 20.4 | 20.1 | 20.0 | 19.8 | 2.9 | Comparative example |
| A4 | 4 | 3.6 | 3.34 | 10 | 32 | 3.0 | 8.8 | 20.2 | 19.7 | 19.5 | 19.3 | 4.5 | Comparative example |
| A5 | 5 | 5.6 | 3.34 | 11 | 24 | 3.3 | 4.3 | 20.6 | 20.1 | 19.8 | 19.5 | 5.3 | Comparative example |
| A6 | 6 | 6.3 | 3.33 | 11 | 30 | 3.3 | 4.7 | 20.2 | 19.6 | 19.3 | 19.0 | 5.9 | Comparative example |
| A7 | 7 | 5.1 | 3.34 | 10 | 32 | 3.0 | 6.3 | 20.1 | 19.3 | 19.3 | 19.5 | 3.0 | Comparative example |
| A8 | 8 | 2.4 | 3.35 | 10 | 25 | 3.0 | 10.5 | 20.5 | 20.3 | 20.2 | 20.0 | 2.4 | Comparative example |
| A9 | 9 | 4.0 | 3.34 | 11 | 29 | 3.3 | 7.3 | 20.2 | 20.0 | 19.8 | 19.5 | 3.5 | Comparative example |
| A10 | 10 | 1.7 | 3.35 | 9 | 29 | 2.7 | 16.7 | 20.4 | 20.2 | 20.1 | 20.0 | 2.0 | Comparative example |

TABLE 4

| | | Capsule content | | | Thickness (TH) of capsule shell (μm) | Crush strength (N)/ diameter (mm) | TH (μm)/ VC (%) | Capsule weight | | | | Percentage of weight loss after 12 months (%) | |
|---|---|---|---|---|---|---|---|---|---|---|---|---|---|
| | No. | Volatilization content (VC) (%) | Capsule diameter (mm) | Crush strength (N) | | | | Initial weight (mg) | 4 months later (mg) | 8 months later (mg) | 12 months later (mg) | | |
| B1 | 1 | 0 | 3.41 | 19 | 62 | 5.6 | — | 21.8 | 21.8 | 21.8 | 21.8 | 0 | Comparative example |
| B2 | 2 | 0 | 3.40 | 18 | 55 | 5.3 | — | 21.7 | 21.8 | 21.7 | 21.7 | 0 | Comparative example |
| B3 | 3 | 2.9 | 3.40 | 18 | 58 | 5.3 | 20.1 | 21.7 | 21.7 | 21.7 | 21.6 | 0.5 | Comparative example |
| B4 | 4 | 3.6 | 3.40 | 18 | 60 | 5.3 | 16.5 | 21.6 | 21.6 | 21.6 | 21.5 | 0.5 | Example |
| B7 | 7 | 5.1 | 3.41 | 18 | 62 | 5.3 | 12.3 | 21.2 | 21.2 | 21.2 | 21.0 | 0.9 | Example |
| B8 | 8 | 2.4 | 3.40 | 17 | 59 | 5.0 | 24.7 | 21.6 | 21.4 | 21.5 | 21.5 | 0.5 | Comparative example |
| B9 | 9 | 4.0 | 3.40 | 18 | 68 | 5.3 | 17.2 | 21.5 | 21.4 | 21.4 | 21.3 | 0.9 | Example |
| B10 | 10 | 1.7 | 3.41 | 18 | 62 | 5.3 | 35.6 | 21.6 | 21.5 | 21.6 | 21.4 | 0.9 | Comparative example |

TABLE 5

| | | Capsule content | | | Thickness (TH) of capsule shell (μm) | Crush strength (N)/ diameter (mm) | TH (μm)/ VC (%) | Capsule weight | | | | Percentage of weight loss after 12 months (%) | |
|---|---|---|---|---|---|---|---|---|---|---|---|---|---|
| | No. | Volatilization content (VC) (%) | Capsule diameter (mm) | Crush strength (N) | | | | Initial weight (mg) | 4 months later (mg) | 8 months later (mg) | 12 months later (mg) | | |
| C1 | 1 | 0 | 3.44 | 25 | 93 | 7.3 | — | 23.1 | 23.0 | 23.1 | 23.1 | 0 | Comparative example |
| C2 | 2 | 0 | 3.44 | 24 | 93 | 7.0 | — | 22.9 | 22.9 | 22.9 | 22.9 | 0 | Comparative example |

TABLE 5-continued

| | Capsule content | | | | | | Capsule weight | | | | Percentage of weight | |
|---|---|---|---|---|---|---|---|---|---|---|---|---|
| No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Initial weight (mg) | 4 months later (mg) | 8 months later (mg) | 12 months later (mg) | loss after 12 months (%) | |
| C3 | 3 | 2.9 | 3.46 | 24 | 98 | 6.9 | 34.0 | 22.9 | 23.0 | 23.1 | 22.9 | 0 | Comparative example |
| C4 | 4 | 3.6 | 3.45 | 23 | 85 | 6.7 | 23.4 | 22.6 | 22.5 | 22.4 | 22.4 | 0.9 | Example |
| C5 | 5 | 5.6 | 3.44 | 26 | 95 | 7.6 | 17.0 | 23.1 | 23.0 | 23.0 | 23.0 | 0.4 | Example |
| C6 | 6 | 6.3 | 3.44 | 26 | 99 | 7.6 | 15.6 | 22.7 | 22.7 | 22.7 | 22.6 | 0.4 | Example |
| C7 | 7 | 5.1 | 3.45 | 24 | 91 | 7.0 | 18.0 | 22.5 | 22.4 | 22.5 | 22.3 | 0.9 | Example |
| C8 | 8 | 2.4 | 3.46 | 24 | 91 | 6.9 | 38.1 | 22.9 | 23.0 | 22.8 | 22.8 | 0.4 | Comparative example |
| C9 | 9 | 4.0 | 3.45 | 23 | 89 | 6.7 | 22.5 | 22.7 | 22.7 | 22.6 | 22.5 | 0.9 | Example |
| C10 | 10 | 1.7 | 3.46 | 25 | 95 | 7.2 | 54.6 | 23.1 | 23.0 | 23.1 | 23.0 | 0.4 | Comparative example |

As can be appreciated from Tables 3-5 above, the capsules of the examples where the capsule shell contained a polysaccharide, the thickness (TH) of the capsule shell was 60 μm or more and the volatilization content (VC) of the content after 4 hours was 3.0 wt % or more had low percentage of weight loss after 12 months, confirming excellent storage stability. Furthermore, these capsules had crush strength per diameter of the capsule in a range of 3-8 N/mm, and were crushed when pressure was applied with fingers. These capsules can be enclosed in a filter for a smoking equipment and can be crushed by applying pressure via the filter.

On the other hand, when the volatilization content (VC) of the content after 4 hours was 3.0 wt % or more and the thickness (TH) of the capsule shell was less than 60 μm (A4-A7, A9), the percentage of loss after 12 months was high, confirming poor storage stability.

When the volatilization content (VC) of the content after 4 hours was less than 3.0 wt %, the percentage of loss after 12 months tended to be relatively low even when the thickness (TH) of the capsule shell was less than 60 μm (A3, A8, A10).

Capsule Production Example 2

Capsules were produced in the same manner as <Capsule production> of Capsule production example 1 except that the capsule shell formulation was as shown in Table 6, and capsule content No. 4 was used as the capsule content. The diameter of the capsule was about 3.5 mmφ and the weight of the capsule content to be encapsulated was 19.3 mg.

TABLE 6

Capsule shell formulation

| Ingredient | Weight (%) |
|---|---|
| Pork gelatin (BCN250SC; from Nitta Gelatin Inc.) | 80 |
| Glycerine (food-additive-grade glycerine; from Sakamoto Yakuhin Kogyo Co., Ltd.) | 19.5 |
| Blue No. 1 (Edible blue No. 1; from San-Ei Gen F.F.I., Inc.) | 0.5 |

The thickness of the capsule shell and the crush strength of the capsule were determined for the produced capsules. The results are shown in Table 7.

TABLE 7

| | Capsule content | | | | | | | | |
|---|---|---|---|---|---|---|---|---|---|
| No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| E1 | 4 | 3.6 | 3.32 | 31 | 30 | 9.7 | 8.3 | 7 | 20.5 | Comparative example |
| E2 | 4 | 3.6 | 3.39 | Unable to crush | 68 | — | 18.9 | 11 | 21.4 | Comparative example |
| E3 | 4 | 3.6 | 3.43 | Unable to crush | 98 | — | 27.2 | 15 | 22.7 | Comparative example |

As can be appreciated from Table 7, when the capsule shell did not contain a polysaccharide, the capsule had high crush strength or was unable to crush in the first place.

Capsule Production Example 3

Capsules were produced in the same manner as <Capsule production> of Capsule production example 1 except that the capsule shell formulation was as shown in Table 8, and capsule content No. 5 was used as the capsule content. The diameter of the capsule was about 3.5 mmφ and the weight of the capsule content to be encapsulated was 19.3 mg.

TABLE 8

| Capsule shell formulation | |
|---|---|
| Ingredient | Weight (%) |
| Gellan gum (Kelcogel; from CP Kelco) | 25 |
| Pork gelatin (BCN250SC; from Nitta Gelatin Inc.) | 50 |
| Hydrogenated starch hydrolysate (PO10; from Toa Kasei Co., Ltd.) | 15 |
| Glycerine (food-additive-grade glycerine; from Sakamoto Yakuhin Kogyo Co., Ltd.) | 9.5 |
| Blue No. 1 (Edible blue No. 1; from San-Ei Gen F.F.I., Inc.) | 0.5 |

The thickness of the capsule shell and the crush strength of the capsule were determined for the produced capsules. The results are shown in Table 9.

TABLE 9

| | Capsule content | | | | | | | | |
|---|---|---|---|---|---|---|---|---|---|
| No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| F1 | 5 | 5.6 | 3.35 | 9 | 32 | 2.7 | 5.7 | 7 | 20.3 | Comparative example |
| F2 | 5 | 5.6 | 3.41 | 15 | 69 | 4.4 | 12.3 | 11 | 21.7 | Example |
| F3 | 5 | 5.6 | 3.46 | 26 | 98 | 7.5 | 17.5 | 15 | 22.9 | Example |

Capsule Production Example 4

Capsules were produced in the same manner as <Capsule production> of Capsule production example 1 except that the capsule shell formulation was as shown in Table 10, and capsule content No. 5 was used as the capsule content. The diameter of the capsule was about 3.5 mmφ and the weight of the capsule content to be encapsulated was 19.3 mg.

TABLE 10

| Capsule shell formulation | |
|---|---|
| Ingredient | Weight (%) |
| κ-Carrageenan | 15 |
| Gellan gum (Kelcogel; from CP Kelco) | 40 |
| Maltodextrin (DE = 10-12) | 20 |
| Hydrogenated starch hydrolysate (PO10; from Toa Kasei Co., Ltd.) | 15 |
| Glycerine (food-additive-grade glycerine; from Sakamoto Yakuhin Kogyo Co., Ltd.) | 9.5 |
| Blue No. 1 (Edible blue No. 1; from San-Ei Gen F.F.I., Inc.) | 0.5 |

The thickness of the capsule shell and the crush strength of the capsule were determined for the produced capsules. The results are shown in Table 11.

TABLE 11

| | Capsule content | | | | | | | | |
|---|---|---|---|---|---|---|---|---|---|
| No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| G1 | 5 | 5.6 | 3.35 | 8 | 24 | 2.4 | 4.3 | 7 | 20.2 | Comparative example |
| G2 | 5 | 5.6 | 3.40 | 18 | 47 | 5.3 | 8.4 | 11 | 21.7 | Comparative example |
| G3 | 5 | 5.6 | 3.44 | 21 | 77 | 6.1 | 13.8 | 15 | 23.1 | Example |

Capsule Production Example 5

Capsules were produced in the same manner as <Capsule production> of Capsule production example 1 except that the capsule shell formulation was as shown in Table 12, and capsule content No. 5 was used as the capsule content. The diameter of the capsule was about 3.5 mmφ and the weight of the capsule content to be encapsulated was 19.3 mg.

TABLE 12

| Capsule shell formulation | |
|---|---|
| Ingredient | Weight (%) |
| κ-Carrageenan | 10 |
| Gellan gum (Kelcogel; from CP Kelco) | 55 |

TABLE 12-continued

| Capsule shell formulation | |
|---|---|
| Ingredient | Weight (%) |
| Starch | 20 |
| Glycerine (food-additive-grade glycerine; from Sakamoto Yakuhin Kogyo Co., Ltd.) | 14.9 |
| Yellow No. 5 (Edible Yellow No. 5; from San-Ei Gen F.F.I., Inc.) | 0.1 |

The thickness of the capsule shell and the crush strength of the capsule were determined for the produced capsules. The results are shown in Table 13.

TABLE 13

| | Capsule content | | | | | | | | |
|---|---|---|---|---|---|---|---|---|---|
| | No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| H1 | 5 | 5.6 | 3.35 | 9 | 31 | 2.7 | 5.5 | 7 | 20.7 | Comparative example |
| H2 | 5 | 5.6 | 3.40 | 14 | 49 | 4.1 | 8.8 | 11 | 21.6 | Comparative example |
| H3 | 5 | 5.6 | 3.45 | 22 | 81 | 6.4 | 14.5 | 15 | 23.5 | Example |

Capsule Production Example 6

Capsules were produced in the same manner as <Capsule production> of Capsule production example 1 except that the capsule shell formulation was as shown in Table 14, and capsule content No. 5 was used as the capsule content. The diameter of the capsule was about 3.5 mmφ and the weight of the capsule content to be encapsulated was 19.3 mg.

TABLE 14

| Capsule shell formulation | |
|---|---|
| Ingredient | Weight (%) |
| κ-Carrageenan | 5 |
| Gellan gum (Kelcogel; from CP Kelco) | 60 |
| Starch | 20 |
| Glycerine (food-additive-grade glycerine; from Sakamoto Yakuhin Kogyo Co., Ltd.) | 14.9 |
| Yellow No. 5 (Edible Yellow No. 5; from San-Ei Gen F.F.I., Inc.) | 0.1 |

The thickness of the capsule shell and the crush strength of the capsule were determined for the produced capsules. The results are shown in Table 15.

TABLE 15

| | Capsule content | | | | | | | | |
|---|---|---|---|---|---|---|---|---|---|
| | No. | Volatilization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| J1 | 5 | 5.6 | 3.33 | 11 | 33 | 3.3 | 5.9 | 7 | 20.1 | Comparative example |

TABLE 15-continued

| | Capsule content | | | | | | | | |
|---|---|---|---|---|---|---|---|---|---|
| No. | Volatil-ization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| J2 | 5 | 5.6 | 3.39 | 18 | 57 | 5.3 | 10.2 | 11 | 21.1 | Comparative example |
| J3 | 5 | 5.6 | 3.43 | 24 | 75 | 7.0 | 13.4 | 15 | 22.3 | Example |

Capsule Production Example 7

Capsules were produced in the same manner as <Capsule production> of Capsule production example 1 except that the capsule shell formulation was as shown in Table 16, capsule content No. 5 was used as the capsule content, the diameter of the capsule was about 2.7 mmφ, and the weight of the capsule content to be encapsulated was 10 mg.

TABLE 16

Capsule shell formulation

| Ingredient | Weight (%) |
|---|---|
| κ-Carrageenan | 7.9 |
| Gellan gum (Kelcogel; from CP Kelco) | 49 |
| Agar (AX200; from Ina Food Industry Co., Ltd.) | 1 |
| Starch | 28 |
| Degraded guar gum (Sunfiber; from Taiyo Kagaku Co., Ltd.) | 2 |
| Glycerine (food-additive-grade glycerine; from Sakamoto Yakuhin Kogyo Co., Ltd.) | 12 |
| Yellow No. 5 (Edible Yellow No. 5; from San-Ei Gen F.F.I., Inc.) | 0.1 |

The thickness of the capsule shell and the crush strength of the capsule were determined for the produced capsules. The results are shown in Table 17.

TABLE 17

| | Capsule content | | | | | | | | |
|---|---|---|---|---|---|---|---|---|---|
| No. | Volatil-ization content (VC) (%) | Capsule diameter (mm) | Crush strength (N) | Thickness (TH) of capsule shell (μm) | Crush strength (N)/ diameter (mm) | TH (μm)/ VC (%) | Shell ratio (wt %) | Capsule weight (mg) | |
| K1 | 5 | 5.6 | 2.72 | 7 | 32 | 2.1 | 5.7 | 8 | 11.0 | Comparative example |
| K2 | 5 | 5.6 | 2.78 | 11 | 51 | 3.2 | 9.1 | 13 | 11.3 | Comparative example |
| K3 | 5 | 5.6 | 2.87 | 16 | 88 | 4.7 | 15.7 | 19 | 11.5 | Example |

INDUSTRIAL APPLICABILITY

The breakable seamless capsule of the present invention can favorably be used in a filter for a smoking equipment or in a smoking equipment using the same.

DESCRIPTION OF REFERENCE NUMERALS

1 Capsule content
2 Capsule shell
3 Seamless capsule

The invention claimed is:

1. A breakable seamless capsule for a smoking equipment, comprising a content containing an oily ingredient and a capsule shell for encapsulating said content, wherein:
the capsule shell contains a polysaccharide;
the thickness of the capsule shell is 60 μm or more;
the volatilization content (VC) of the encapsulated content after leaving the encapsulated content to stand under an environment at a temperature of 25° C. and a relative humidity of 40% for 4 hours is 3.0 wt % or more with respect to the total weight of the encapsulated content;
the crush strength per diameter of the capsule is 3-8 N/mm; and
the ratio of the thickness (TH) of the capsule shell to the volatilization content (VC) of the encapsulated content (TH (μm)/VC (wt %)) is 8 or more and 50 or less.

2. The capsule according to claim 1, wherein the polysaccharide comprises a polysaccharide having gelling capacity.

3. The capsule according to claim 2, wherein the polysaccharide having gelling capacity comprises at least one selected from the group consisting of gellan gum, carrageenan and agar.

4. The capsule according to claim 1, wherein the capsule shell comprises the following with respect to the total weight of the capsule shell:
20-80 wt % of the polysaccharide having gelling capacity;
4-20 wt % of glycerine; and
0-40 wt % of at least one selected from starch, dextrins and hydrogenated starch hydrolysates.

5. The capsule according to claim 1, wherein the thickness of the capsule shell is 60-110 μm.

6. The capsule according to claim 1, wherein the capsule shell further comprises gelatin.

7. The capsule according to claim 1, wherein the polysaccharide comprises at least one selected from the group consisting of gellan gum, carrageenan, agar, guar gum, guar gum derivatives, enzymatically degraded guar gum, alginic acid or salts thereof, starch and dextrins.

8. The capsule according to claim 1, wherein the oily ingredient comprises a flavoring agent.

9. The capsule according to claim 8, wherein the flavoring agent is at least one selected from the group consisting of spearmint, menthol, peppermint and berries.

10. The capsule according to claim 1, wherein the ratio of the shell to the capsule is 9.0-18.0 wt %.

11. A filter for a smoking equipment comprising the capsule according to claim 1.

12. A smoking equipment comprising the capsule according to claim 1.

* * * * *